United States Patent
Wang et al.

(10) Patent No.: US 11,900,951 B2
(45) Date of Patent: Feb. 13, 2024

(54) AUDIO PACKET LOSS CONCEALMENT METHOD, DEVICE AND BLUETOOTH RECEIVER

(71) Applicant: Nanjing Zgmicro Company Limited, Jiangsu (CN)

(72) Inventors: Haiye Wang, Nanjing (CN); Yuhong Feng, Nanjing (CN); Xiaodong Yang, Nanjing (CN); Yinong Zhang, Nanjing (CN)

(73) Assignee: Nanjing Zgmicro Company Limited, Wuxi (CN)

(*) Notice: Subject to any disclaimer, the term of this patent is extended or adjusted under 35 U.S.C. 154(b) by 348 days.

(21) Appl. No.: 17/359,607

(22) Filed: Jun. 27, 2021

(65) Prior Publication Data
US 2021/0327440 A1    Oct. 21, 2021

Related U.S. Application Data

(63) Continuation of application No. PCT/CN2019/128779, filed on Dec. 26, 2019.

(51) Int. Cl.
*G10L 19/005* (2013.01)
*H04W 4/80* (2018.01)
(Continued)

(52) U.S. Cl.
CPC ........ *G10L 19/005* (2013.01); *G10L 19/0017* (2013.01); *G10L 19/02* (2013.01); *H04W 4/80* (2018.02)

(58) Field of Classification Search
CPC ... G10L 19/005; G10L 19/0017; G10L 19/02; H04W 4/80; H04W 28/04; Y02D 30/70
See application file for complete search history.

(56) References Cited

U.S. PATENT DOCUMENTS

2015/0372530 A1* 12/2015 Chu ................ H02J 50/10
320/108
2016/0148618 A1* 5/2016 Huang ............. G10L 19/167
381/2

FOREIGN PATENT DOCUMENTS

CN    101548555 A    9/2009
CN    101937679 A    1/2021

OTHER PUBLICATIONS

Hadas Ofir and Davis Malah, "Packet Loss Concealment for Audio Streaming based on the GAPES and MAPES Algorithms," 2006 IEEE 24th Convention of Electrical & Electronics Engineers in Israel, 2006, pp. 280-284, doi: 10.1109/EEEI.2006.321071. (Year: 2006).*

(Continued)

*Primary Examiner* — Thien Nguyen
(74) *Attorney, Agent, or Firm* — Joe Zheng (57) ABSTRACT

An audio packet loss concealment method, an audio packet loss concealment device and a Bluetooth receiver are described. The audio packet loss concealment method comprises: determining whether each data packet divided into a plurality of frequency bins in a frequency domain is correct after audio data is transformed from a time domain to the frequency domain; classifying the frequency bins in the incorrect data packet into a first set of frequency bins and a second set of frequency bins; and recovering data in the first set of frequency bins by a GAPES algorithm, and recovering data in the second set of frequency bins by a predefined algorithm, wherein the predefined algorithm involves far less computation when compared with the GAPES algorithm.

17 Claims, 5 Drawing Sheets

(51) Int. Cl.
*G10L 19/00* (2013.01)
*G10L 19/02* (2013.01)

(56) References Cited

OTHER PUBLICATIONS

1st Office Action from Chinese Patent Office on the corresponding application pending in China, dated Feb. 10, 2023.

\* cited by examiner

AUDIO PACKET LOSS CONCEALMENT METHOD, DEVICE AND BLUETOOTH RECEIVER

CROSS-REFERENCES TO RELATED APPLICATIONS

This patent application is a continuation of PCT/CN2019/128779 filed Dec. 26, 2019, which claims the priority of Chinese Patent Application No.: 201811621826.4, filed on Dec. 28, 2018 in China, and the entire content of which is incorporated herein by reference.

BACKGROUND OF THE INVENTION

Field of the Invention

The present disclosure relates to the field of audio communication technology, and in particular, to an audio packet loss concealment method, an audio packet loss concealment device, and a Bluetooth receiver.

Description of the Related Art

Bluetooth audio transmission means that a Bluetooth audio transmitter transmits audio data packets to a Bluetooth audio receiver through a wireless connection channel. However, because Bluetooth is a wireless connection, some audio data packets sent by the Bluetooth audio transmitter may not be received by the Bluetooth audio receiver when the interference is large or the connection distance is long. That is to say, these audio data packets are lost, and the loss of the audio data packets will significantly degrade the audio quality.

Figure 1:
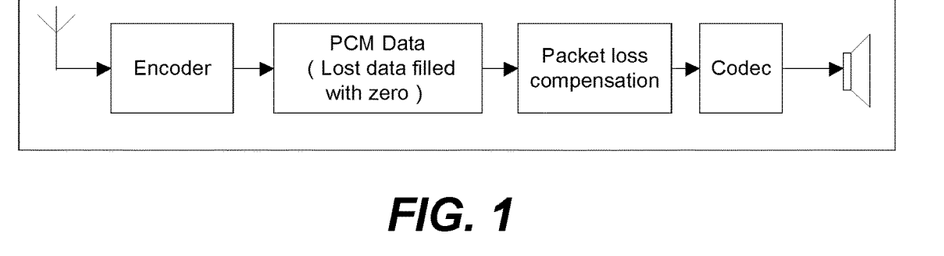
FIG. 1 is a schematic diagram of a receiver that realizes audio packet loss concealment in the related art.

In order to solve the problem of audio data packet loss, a packet concealment technology based on the audio data at the receiving end is usually used in related technologies. As shown in FIG. 1, the lost data is filled with zero and then decoded after a packet loss concealment operation. In the packet loss concealment operation in the prior art systems, some simple algorithms are used and include noise replacement, waveform replacement, packet repetition and so on. Advanced estimation algorithms include interpolation in a compressed domain, sine audio modeling interpolation and so on.

Figure 2:
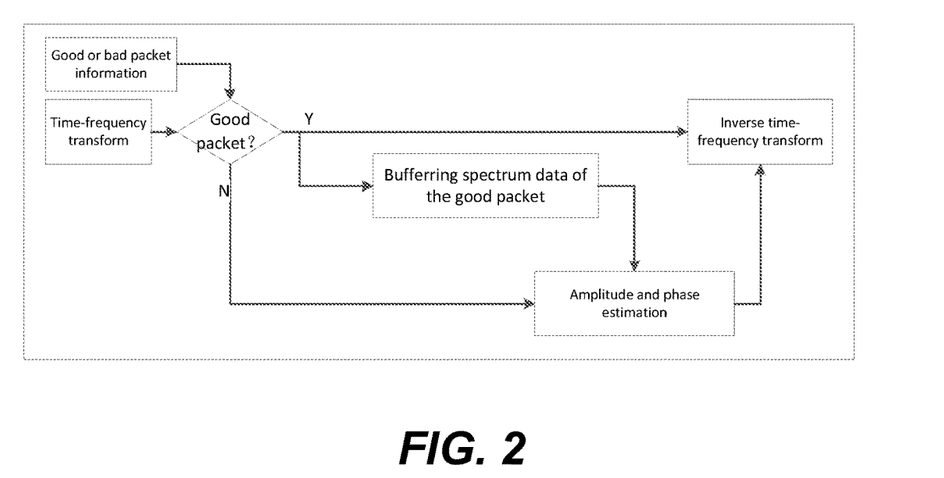
FIG. 2 is a flowchart of a packet loss concealment method based on the GAPES algorithm in the related art.

FIG. 2 shows a flowchart of an audio packet loss concealment method based on Gapped-data Amplitude and Phase Estimation (GAPES) algorithm. As shown in FIG. 2, the packet loss concealment method is based on the GAPES algorithm that includes the following operations. If the current data packet is a good packet (i.e., correct data packet), a time-frequency inverse transform is directly performed on spectrum data of the current data packet to obtain reconstructed time-domain signal. In addition, in order to recover the following bad packets (i.e., incorrect data packets), the spectrum data of the good packets needs to be saved in a buffer. If the current data packet is a bad packet, the spectrum data of each frequency bin of the bad packet is estimated by the GAPES algorithm according to the data spectrum of the buffered good packet.

Compared with other methods currently in use, the method based on the GAPES algorithm has significantly improved the quality of packet loss concealment, and it has a good effect even at a 30% packet loss rate. However, the computational complexity is significant and not practical for embedded real-time systems without sufficient computing resources, such as Bluetooth speakers. Therefore, there is a need for an improved technical solution to solve the above-mentioned problems.

SUMMARY OF THE INVENTION

In general, the present invention is related to an audio packet loss concealment method, an audio packet loss concealment device, and a Bluetooth receiver. The present invention provided according to one embodiment of the present invention to solve the above technical problems.

According to one aspect of the present invention, an audio packet loss concealment method is provided and comprises: receiving audio data including a plurality of data packets; determining whether each of the data packets divided into a plurality of frequency bins in a frequency domain is correct after the audio data is transformed from a time domain to the frequency domain; classifying the frequency bins in an incorrect data packet into a first set of frequency bins and a second set of frequency bins; and recovering data in the first set of frequency bins by a GAPES algorithm, and recovering data in the second set of frequency bins by a predefined algorithm, wherein the predefined algorithm involves far less computation when compared with the GAPES algorithm.

According to another aspect of the present invention, an audio packet loss concealment device for concealing audio packet loss, comprises: a determining module configured for determining whether each data packet divided into a plurality of frequency bins in a frequency domain is correct after audio data is transformed from a time domain to the frequency domain; a classification module configured for classifying the frequency bins in the incorrect data packet into a first set of frequency bins and a second set of frequency bins; and a recovery module configured for recovering data in the first set of frequency bins by a GAPES algorithm, and recovering data in the second set of frequency bins by a predefined algorithm, wherein the predefined algorithm involves far less computation when compared with the GAPES algorithm.

According to another aspect of the present invention, a Bluetooth receiver comprises: an antenna; a memory configured for storing one or more modules; a processor configured for executing the modules to perform: determining whether each data packet divided into a plurality of frequency bins in a frequency domain is correct after audio data is transformed from a time domain to the frequency domain; classifying the frequency bins in the incorrect data packet into a first set of frequency bins and a second set of frequency bins; and recovering data in the first set of frequency bins by a GAPES algorithm, and recovering data in the second set of frequency bins by a predefined algorithm, wherein the predefined algorithm involves far less computation when compared with the GAPES algorithm.

One of the advantages, features or advantages of the present invention is that the frequency bins of the incorrect data packet is classified into a first set of frequency bins and a second set of frequency bins, the GAPES algorithm is used to estimate the data in the first set of frequency bins, and the simple algorithm is used to estimate the data in the second set of frequency bins. Thus, the computational complexity is reduced, and the audio packet loss concealment scheme is suitable for embedded real-time systems without sufficient computing resources, such as Bluetooth speakers.

There are many other objects, together with the foregoing attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE PREFERRED EMBODIMENTS

The detailed description of the invention is presented largely in terms of procedures, operations, logic blocks, processing, and other symbolic representations that directly or indirectly resemble the operations of data processing devices that may or may not be coupled to networks. These process descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be comprised in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

According to an audio packet loss concealment method based on a GAPES algorithm, spectrum data of each frequency bin of a bad packet is estimated directly by the GAPES algorithm in reference to the spectrum data of the buffered good packet. As indicated above, the computation involved in the algorithm is significant in embedded real-time systems without sufficient computing resources, such as Bluetooth speakers.

In addition, it is required that the GAPES estimation for n consecutive packets including bad packets should be completed within one packet time for a continuous data stream so as to ensure that the estimated packets can keep up with the output of the previous packet and meet the output requirements of a real-time system. In this way, the system has high requirements for average execution speed (Million Instructions Per Second or MIPS) of single-word fixed-point instructions, which is not practical to use in embedded real-time systems without sufficient computing resources, such as Bluetooth speakers. Therefore, an improved audio packet loss concealment scheme based on the GAPES algorithm is disclosed so as to realize high-quality audio packet loss concealment in real time on embedded real-time systems without sufficient computing resources, such as Bluetooth speaker.

In order to achieve the above and other objective, an audio packet loss concealment method, according to one embodiment of the present invention, comprises: determining whether each data packet divided into a plurality of frequency bins in frequency domain is correct after audio data is transformed from time domain to frequency domain; classifying the frequency bins in an incorrect data packet into a first set of frequency bins and a second set of frequency bins; and recovering data in the first set of frequency bins by a GAPES algorithm, and recovering data in the second set of frequency bins by a simple algorithm. By further classifying and processing the data in the bad packets, the computational complexity is reduced, and the audio packet loss concealment scheme is suitable for embedded real-time systems without sufficient computing resources, such as Bluetooth speakers.

In the present invention, Fast Fourier Transform (FFT) is used for time-frequency transform. Before the FFT transform, an analysis window is added to the time-domain signal, and then the FFT transform is performed. Generally, Inverse Fast Fourier Transform (IFFT) is used for inverse time-frequency transform. A synthesis window is added to the signal after the IFFT transformation, and then an overlap-add processing is preformed to obtain a reconstructed signal in the time domain. Since the above technologies are commonly used in digital signal processing, they will not be further described in detail herein.

Figure 3:
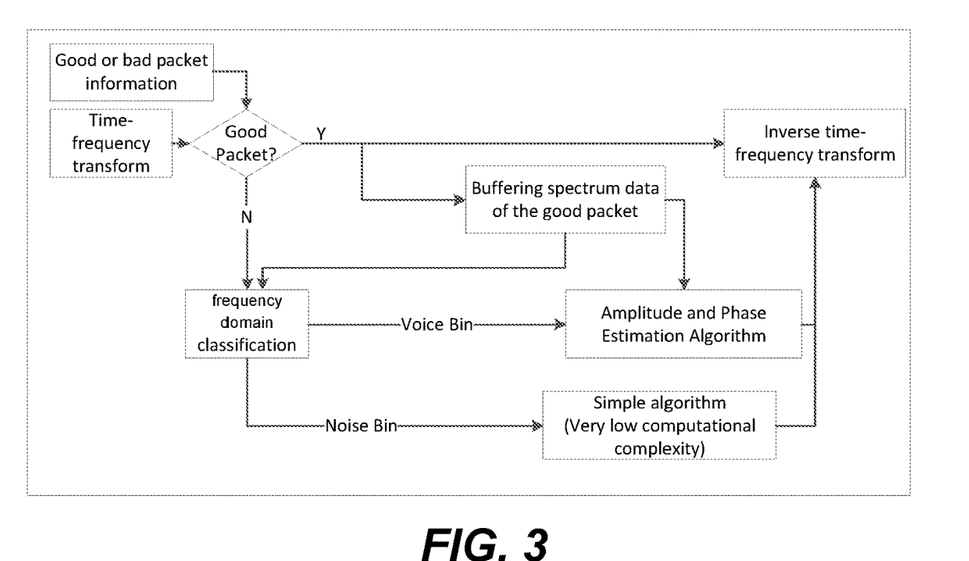
FIG. 3 is a flowchart of an audio packet loss concealment method according to one embodiment of the present invention.

FIG. 3 is a flowchart of an audio packet loss concealment method according to one embodiment of the present invention. After the audio data is transformed from time domain to frequency domain (DSTFT), it is determined whether each data packet is correct or not. Each packet is divided into a plurality of frequency bins in the frequency domain. If the current data packet is incorrect, namely, the current data packet is a bad packet, the frequency bins in the incorrect data packet are classified into a first set of frequency bins, e.g., tone bins, and a second set of frequency bins, e.g., noise bins. The GAPES algorithm is used to recover or estimate the data in the first set of frequency bins in the incorrect data packet. The simple algorithm is used to recover or estimate the data in the second set of frequency bins in the incorrect data packet.

In one embodiment, frequency bins (sometimes called as frequency band) of the data packet is classified in frequency domain. Firstly, the bins in the frequency domain are divided into two categories, one is the tone bins estimated by the GAPES algorithm, and the other is the noise bins estimated by the simple algorithm or even directly assigned zero value. The computational complexity of the simple algorithm is much lower than that of the GAPES algorithm. As a result, the computation complexity will be greatly reduced.

Figure 4:
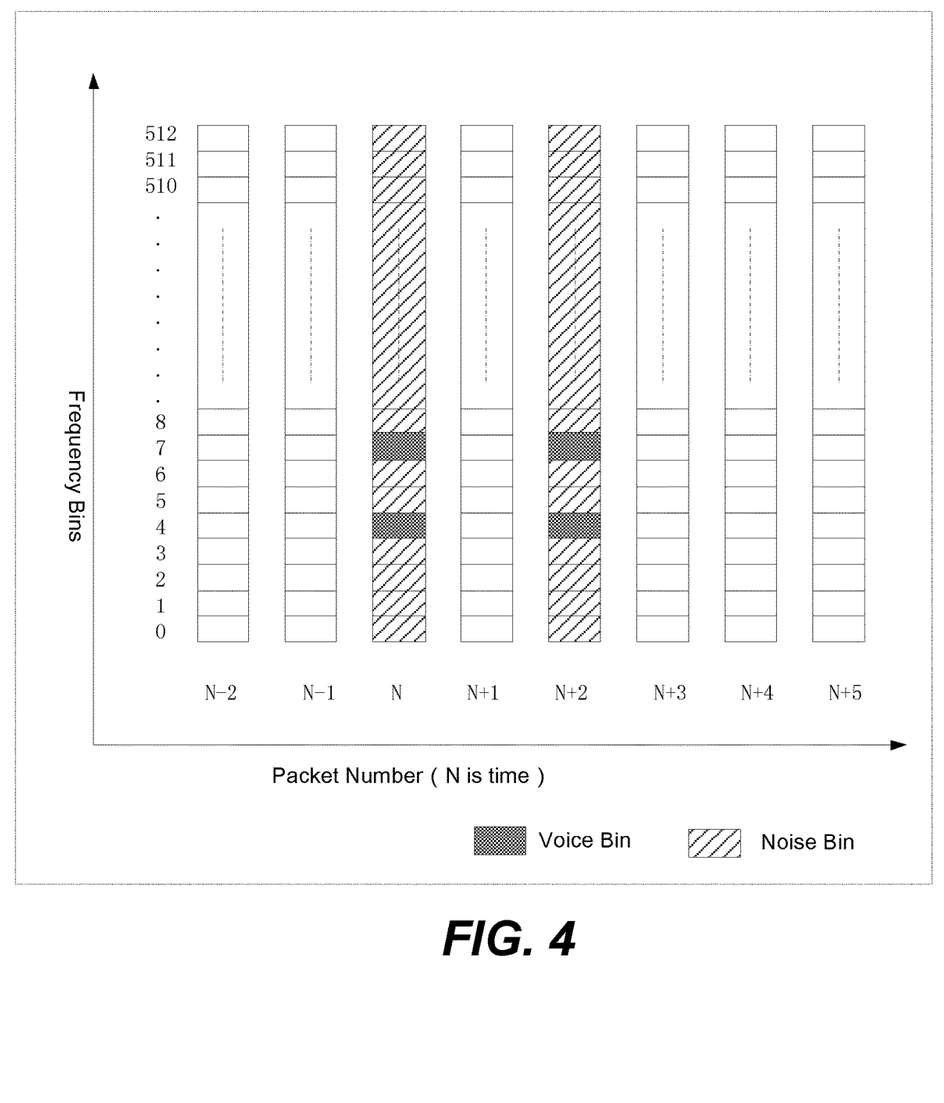
FIG. 4 is a schematic diagram of data structure after frequency domain classification according to one embodiment of the present invention.

FIG. 4 is a schematic diagram of data structure after the frequency domain classification according to one embodiment of the present invention. After using 1024-point FFT to generate 513 frequency bins in the frequency domain for each data packet, the data packets N and N+2 are determined to be bad packets. The 4th and 7th frequency bins in the data packets N and N+2 are classified as the tone bins, and the remaining bins are classified as the noise bins.

For example, 1024-point FFT is used to generate 513 bins in the frequency domain, which are divided into 30 tone bins estimated by the GAPES algorithm and 483 noise bins estimated by the simple algorithm after the frequency-domain classification processing. The simple algorithm is a predefined algorithm that requires far less computations compared to the GAPES algorithm. An exemplary simple algorithm may be noise shaping and random phase method. As a result, the calculation is reduced by 93% from the original 4300 mips to 300 mips, and the audio quality obtained by the audio packet loss concealment method of the present invention at a packet error rate of 10% is basically the same as the audio quality obtained by the traditional method of all the 513 frequency bins being estimated by the GAPES algorithm. For a detailed introduction of the GAPES algorithm, please refer to the paper "Packet Loss Concealment for Audio Streaming Based on the GAPES Algorithm" published by Hadas Ofir and David Malah in 2005, which is hereby incorporated by reference.

In one embodiment, after determining whether each data packet is correct, and before recovering data in the first set of frequency bins based on a GAPES algorithm, and recovering data in the second set of frequency bins based on a simple algorithm, the audio packet loss concealment method further comprises: buffering spectrum data of the correct packets. Buffering spectrum data of the correct data packet is to perform frequency domain classification in the next operations and use the GAPES algorithm to recover or estimate the spectrum data of the tone bins of the incorrect data packet.

In one embodiment, the frequency domain classification may include the following operations: determining a correct data packet among n consecutive data packets including an incorrect data packet, and average energy in each frequency bin in the correct data packets, taking the average energy in each frequency bin in the correct data packet as the energy of the corresponding frequency bin in the incorrect data packet, then determining the first set of frequency bins (e.g., the tone bins) and the second set of frequency bins (e.g., the noise bins) according to the energy of each frequency bin in the incorrect data packet.

There are many ways to determine the first set of frequency bins (e.g., the tone bins) and the second set of frequency bins (e.g., the noise bins) according to the energy of each frequency bin in the incorrect data packet. For example, the frequency bins are arranged in descending order of energy, the first N frequency bins are selected as the first set of frequency bins, and the rest are selected as the second set of frequency bins; Or an energy threshold is set, the energy of each frequency bin is compared with the energy threshold, and the frequency bins whose energy exceeds the energy threshold are selected as the first set of frequency bins, and the rest frequency bins are selected as the second set of frequency bins. For a detailed introduction of frequency domain classification, please refer to a peak detection method introduced in the paper "An mdct domain frame-loss concealment technique for mpeg advanced audio coding" published by SU Ryu, and K. Rose in 2007, which is omitted here.

In one embodiment, the data packets including the incorrect data packets and the correct data packets are inputted sequentially from an input position to a processing queue in a receiving order. The processing queue includes P positions. Each position of the processing queue is used to store one data packet. The P positions include an input position, an output position, and a detection position N located at a fixed position between the input position and the output position, and P is an integer greater than or equal to 2. That is, the input position and the detection position may be the same position. When the data packet at the detection position is determined to be incorrect, the data in the second set of frequency bins in the incorrect data packets in the n consecutive data packets including the incorrect data packet at the detection position is recovered or estimated by the GAPES algorithm, and the data in the first set of frequency bins of the incorrect data packets in the n consecutive data packets is recovered or estimated by the simple algorithm according to the n consecutive data packets including the incorrect data packet at the detection position, wherein n are integers greater than or equal to 1.

In the one embodiment, the audio packet loss concealment method further comprises: outputting n-x estimated data packets starting from the detection position in order. The n consecutive data packets are n consecutive data packets starting from x-th packet in front of the incorrect data packets at the detection position, x is greater than or equal to 0 and less than or equal to n−1.

For an example shown in FIG. 4, the total number of data packets used in the GAPES algorithm is 8, which are N−2, N−1, N, N+1, N+2, N+3, N+4, N+5 respectively. The first two packets N−2 and N−1 are good packets that have been recovered or estimated. When the third packet N is determined to be incorrect, the GAPES algorithm is started, and all the bad packets N, N+2 in the six packets N, N+1, N+2, N+3, N+4, N+5 are recovered by one time GAPES estimation. The number of the bad packets in the six packets from the third packet N to the eighth packet N+5 is greater than or equal to 1 and less than or equal to 6.

Figure 5:
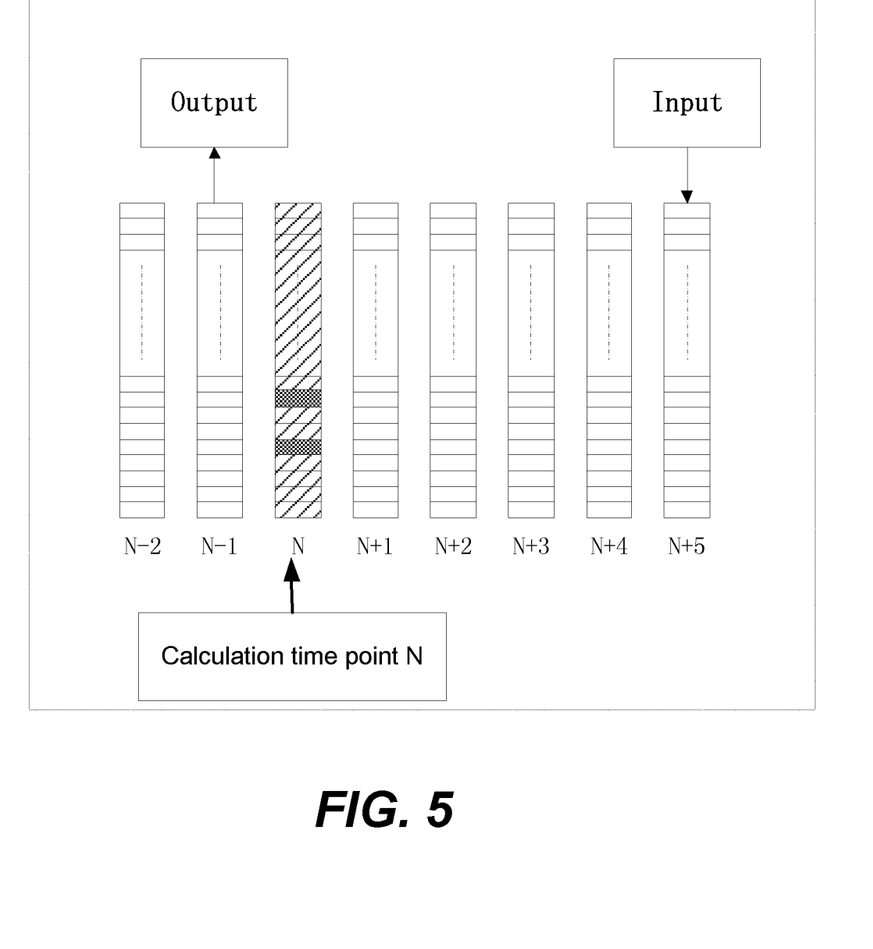
FIG. 5 is a schematic diagram of an application example of a GAPES algorithm according to one embodiment of the present invention.

FIG. 5 is a schematic diagram of an application example of the GAPES algorithm according to one embodiment of the present invention. Data enters the buffer from the N+5 position in packets and exits the buffer from the N−1 position in packet. The position N−1 is used as the output position, and the N+5 position is used as the input position. When there is a bad packet at the detection position N, the GAPES algorithm is started. Since the position N−1 is used as the output point, it is required that the GAPES estimate for the n consecutive packets including the bad packets should be calculated within 1 packet time to ensure that the estimated data packets can keep up with the output of the previous packet and meet the output requirements of the real-time system. In this way, the real-time system has high requirements for the average execution speed (Million Instructions Per Second, MIPS) of single-word fixed-point instructions, which is not conducive to use in embedded real-time systems without sufficient computing resources, such as Bluetooth speakers.

In order to overcome the above problems, an improved GAPES algorithm is also proposed according to one embodiment of the present invention. In the one embodiment, the n-x estimated data packets is outputted from the output position in order. The distance between the detection position N of the processing queue and the output position of the processing queue is s positions, and the distance between the detection position N and the input position is t positions; s is an integer greater than or equal to 1, and less than or equal to t+1; the t is an integer greater than or equal to 0.

Figure 6:
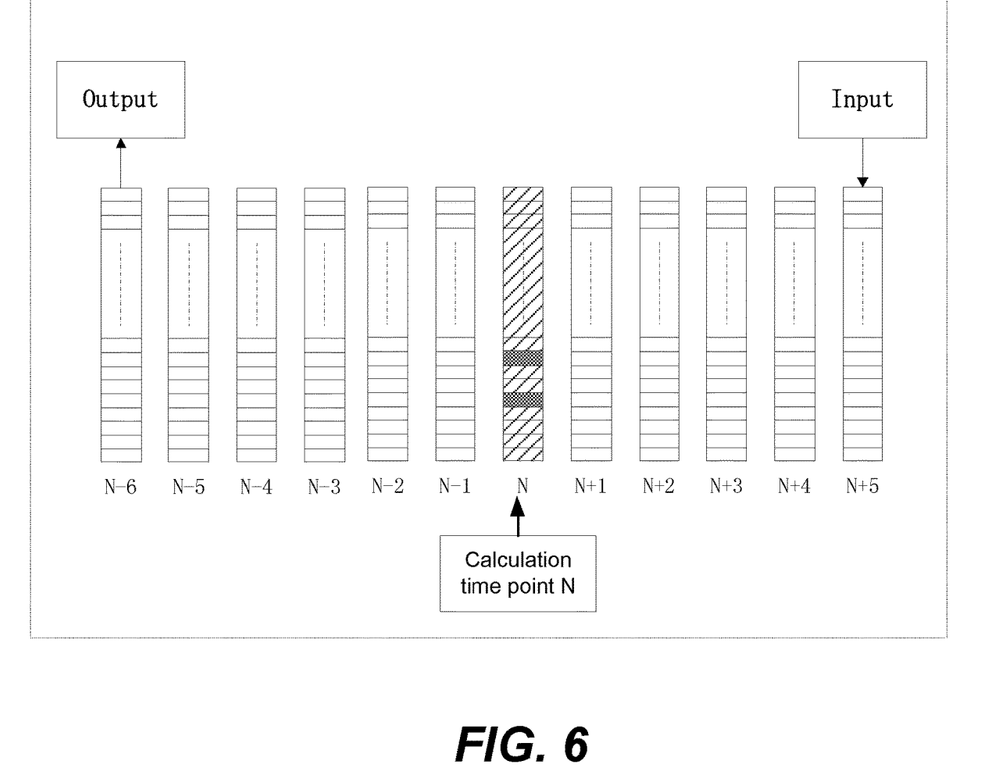
FIG. 6 is a schematic diagram of an application example of an improved GAPES algorithm according to one embodiment of the present invention.

FIG. 6 shows a schematic diagram of an application example of the improved GAPES algorithm according to one embodiment of the present invention. As shown in FIG. 6, the length P of the processing queue is 12, n is 8, s is 6, t is 5, and x is 2. Data from the input flows into the buffer in packets from the position N+5, and flows out from the output in packets from the position N−6. When there is a bad packet at the detection position N, the GAPES estimation is started. The N−6 position is used as the output position. Therefore, in the process of GAPES estimation, there are 6 good data packets N−6, N−5, N−4, N−3, N−2, N−1 that can be output, so the data stream can be kept continuous, so that the improved GAPES estimation won 6 packets of calculation time, the GAPES estimation of 6 packets (N, N+1, N+2, N+3, N+4, N+5) including the bad packet N can be completed in 6 packet time. Thus, the demand for MIPS will be reduced to ⅙ of the original demand.

Figure 7:
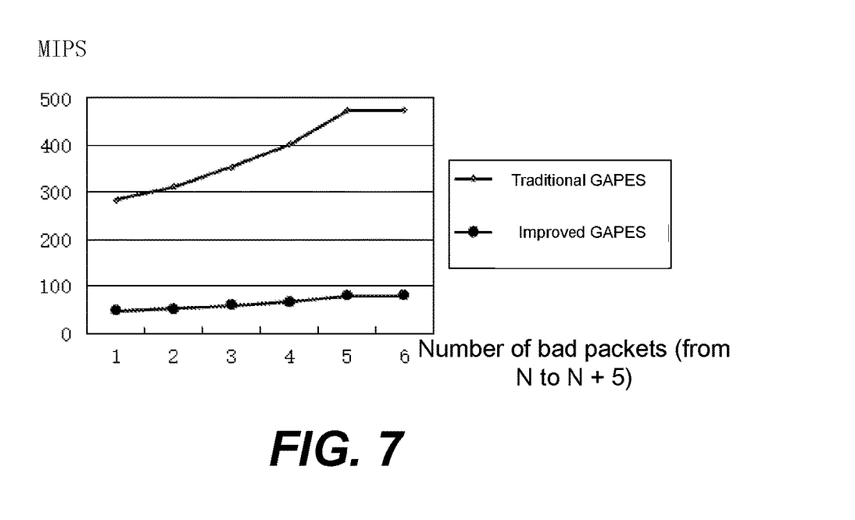
FIG. 7 shows comparison curves of MIPS required by the improved GAPES and the traditional GAPES.

It should be understood that the values of P, n, s, and x in the above examples are shown for illustrative purposes, and are not used to limit the present invention. In order to show more intuitively the advantages of the improved GAPES estimation in reducing MIPS compared to the traditional GAPES estimation after frequency domain classification, the MIPS required by the two methods in the case of different number of packet loss included in 6 packets N, N+1, N+2, N+3, N+4, N+5 are drawn as a curve in FIG. 7. The frequency domain classification can reduce the MIPS demand to the level of the line in the area above the FIG. 7, but the calculation level is also very large and larger than 290 MIPS. Further through the improved GAPES algorithm to average MIPS to multiple packets, the MIPS demand can be reduced to the level of the line in the area below the FIG. 7 (below 80 MIPS).

After classifying the frequency bins in the frequency domain and estimating the tone bins by using the improved GAPES, the calculation amount of the packet loss concealment method in the present invention is greatly reduced, and the real-time implementation in the embedded real-time system with limited MIPS resources is achieved. Based on the same inventive concept, an audio packet loss concealment device is also provided according to one embodiment of the present invention. Since the audio packet loss concealment device solves the same problem with similar principle with the method provided in the first embodiment of the present invention, the implementation of the audio packet loss concealment device can refer to the implementation of the method, and the repetition will not be repeated.

Figure 8:
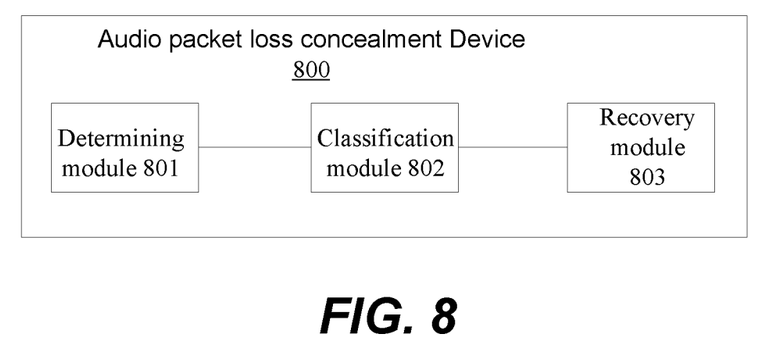
FIG. 8 is a schematic structural diagram of an audio packet loss concealment device according to one embodiment of the present invention.

FIG. 8 shows a schematic structural diagram of an audio packet loss concealment device according to one embodiment of the present invention. As shown in FIG. 8, the audio packet loss concealment device 800 includes: a determining module 801 configured for transforming audio data from a time domain to a frequency domain and determining whether each data packet divided into a plurality of frequency bins in the frequency domain is correct; a classification module 802 configured for classifying the frequency bins in the incorrect data packet into a first set of frequency bins and a second set of frequency bins; and a recovery module 803 configured for recovering data in the first set of frequency bins by a GAPES algorithm, and recovering data in the second set of frequency bins by a simple algorithm.

In the audio packet loss concealment device provided according to one embodiment of the present invention, the frequency bins of the incorrect data packet is classified into the first set of frequency bins and the second set of frequency bins; the GAPES algorithm is used to recover the data in the first set of frequency bins; the simple algorithm is used to recover the data in the second set of frequency bins, thereby reducing the computational complexity, making the audio packet loss concealment solution suitable for embedded real-time systems without sufficient computing resources, such as Bluetooth speakers.

Based on the same inventive concept, a Bluetooth receiver is provided according to one embodiment of the present invention. Since the Bluetooth receiver solves the same problem with similar principle with the method provided in the first embodiment of the present invention, the implementation of the Bluetooth receiver can refer to the method can refer to the implementation of the method, and the repetition will not be repeated.

Figure 9:
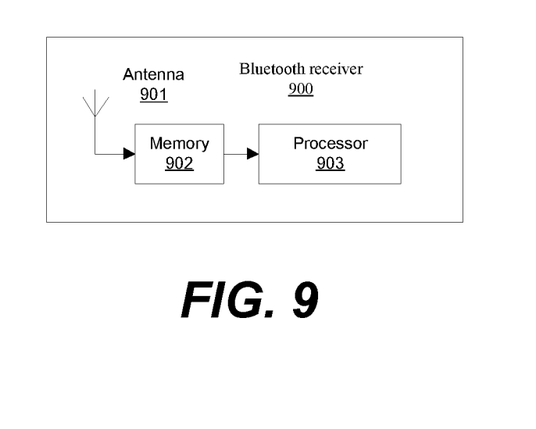
FIG. 9 is a schematic structural diagram of a Bluetooth receiver according to one embodiment of the present invention.

FIG. 9 shows a schematic structural diagram of a Bluetooth receiver according to one embodiment of the present invention. As shown in FIG. 9, the Bluetooth receiver 900 includes: an antenna 901; a memory 902 configured for storing one or more modules; and a processor 903. The processor 903 is configured for executing the modules to perform: determining whether each data packet divided into a plurality of frequency bins in a frequency domain is correct after audio data is transformed from a time domain to the frequency domain; classifying the frequency bins in the incorrect data packet into a first set of frequency bins and a second set of frequency bins; and recovering data in the first set of frequency bins by a GAPES algorithm, and recovering data in the second set of frequency bins by a simple algorithm.

In the Bluetooth receiver provided according to one embodiment of the present invention, the frequency bins of the incorrect data packet is classified into the first set of frequency bins and the second set of frequency bins; the GAPES algorithm is used to recover the data in the first set of frequency bins; the simple algorithm is used to recover the data in the second set of frequency bins, thereby reducing the computational complexity, making the audio packet loss concealment solution suitable for embedded real-time systems without sufficient computing resources, such as Bluetooth speakers.

According to one aspect of the present invention, the present invention can be implemented as a nonvolatile computer-readable medium. The nonvolatile computer-readable medium comprises instructions executed by a processor. The instructions cause the processor to perform: capturing ambient sound; detecting the ambient sound, and triggering the headphone to enter an interactive mode when a preset interested sound appears in the ambient sound; controlling the headphone to output an interactive reminder in the interactive mode. The interactive reminder comprises one type or a combination of multiple types of a visual reminder, a tactile reminder and an auditory reminder.

Those skilled in the art should be aware that the embodiments of this application may be methods, systems, or computer program products. Accordingly, the present application may take the form of a complete hardware embodiment, a complete software embodiment, or an embodiment in conjunction with software and hardware aspects. Furthermore, the present application may take the form of a computer program product implemented on one or more computer-available storage media (including, but not limited to, disk memory, CD-ROM, optical memory, etc.) containing computer-available program code.

The present application is described with reference to methods, equipment (systems), and flow charts and/or block diagrams of computer program products according to the embodiment of the present application. It should be understood that each flow and/or block in a flowchart and/or block diagram, as well as the combination of flow and/or block in a flowchart and/or block diagram, can be implemented by computer program instructions. These computer program instructions may be provided to a processor of a general purpose computer, a dedicated computer, an embedded processor, or other programmable data processing device to produce a machine such that instructions executed by a processor of a computer or other programmable data processing device produce instructions for implementing a flow chart or more. A device for processes and/or block diagrams or functions specified in a box or multiple boxes.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A method for concealing audio packet loss, comprising:
receiving in a Bluetooth receiver audio data including a plurality of data packets;
transforming in the Bluetooth receiver the audio data in a time domain to a frequency domain wherein spectrum of the audio data is divided into a plurality of bands;
determining incorrect data packets among n consecutive data packets and average energy in each of frequency bands in the frequency domain, wherein spectrum of the incorrect data packets is divided into a plurality of bands the frequency bands are classified as a plurality of first bins and second bins based on the determined average energy in each of the frequency bands;
taking the average energy in each of the first bins for the correct data packets as energy of the second bins for the incorrect data packets; and
recovering data in the first bins by a first predefined algorithm, and recovering data in the second set of frequency bins by a second predefined algorithm, wherein the second predefined algorithm involves far less computation than the first predefined algorithm.

2. The method according to claim 1, wherein the first predefined algorithm is a GAPES algorithm and the second predefined algorithm takes far less computation than what the GAPES algorithm takes, resulting in an audio packet loss concealment achieve more efficiently than otherwise using the GAPES entirely through the frequency bands.

3. The method according to claim 1, further comprising: buffering spectrum data of correct data packets in the audio data.

4. The method according to claim 3, wherein said recovering data in the first bins by a first predefined, and recovering data in the second bins by a second predefined algorithm comprises:
providing the data packets sequentially from an input position to a processing queue in a receiving order, wherein the processing queue includes P positions each used to store one data packet, and including the input position, an output position, and a detection position N located at a fixed position between the input position and the output position, and P is an integer greater than or equal to 2; and recovering the data in the first bins in the incorrect data packets of n consecutive data packets including the incorrect data packet at the detection position by the first predefined algorithm, and recovering the data in the second bins of the incorrect data packets in the n consecutive data packets by the second predefined algorithm according to the n consecutive data packets including the incorrect data packet at the detection position when the data packet at the detection position is incorrect, wherein n is integers greater than or equal to 1.

5. The method according to claim 4, wherein the n consecutive data packets are n consecutive data packets starting from x-th data packet in front of the incorrect data packets at the detection position, and x is greater than or equal to 0 and less than or equal to n−1.

6. The method according to claim 5, further comprising: outputting n-x recovered data packets starting from the detection position in order.

7. The method according to claim 5, further comprising:
outputting n-x recovered data packets from the output position in order,
wherein, a distance between the detection position N of the processing queue and the output position of the processing queue is s positions, and a distance between the detection position N and the input position is t positions, and wherein s is an integer greater than or equal to 1, and less than or equal to t+1, and t is an integer greater than or equal to 0.

8. The method according to claim 1, wherein a calculation amount of the simple algorithm is lower than that of the GAPES algorithm.

9. A device for concealing audio packet loss, comprising:
a determining module configured for transforming the audio data in a time domain to a frequency domain, wherein spectrum of the audio data is divided into a plurality of bands, the determining module further configured for determining incorrect data packets among n consecutive data packets and average energy in each of the frequency bands, wherein the frequency bands are classified as a plurality of first bins and second bins based on the determined average energy in each of the frequency bands;
a classification module configured for classifying the frequency bands into first bins and second bins; and
a recovery module configured for recovering data in the first bins by a first predefined algorithm, and recovering data in the second bins by a second predefined algorithm, wherein the second predefined algorithm involves far less computation than the first predefined algorithm.

10. The device according to claim 9, wherein the first predefined algorithm is a GAPES algorithm and the second predefined algorithm takes far less computation than what the GAPES algorithm takes, resulting in an audio packet loss concealment achieved more efficiently than otherwise using the GAPES entirely through the frequency bands.

11. The device according to claim 9, further comprising: a buffer configured for buffering spectrum data of the correct data packet.

12. The device according to claim 11, wherein the recovery module is configured for:
inputting the data packets sequentially from an input position to a processing queue in a receiving order, wherein the processing queue includes P positions, each used to store one data packet, and including the input position, an output position, and a detection position N located at a fixed position between the input position and the output position, and P is an integer greater than or equal to 2;

determining incorrect data packets among n consecutive data packets and average energy in each frequency bands in the frequency domain, wherein spectrum of the incorrect data packets is divided into a plurality of bands the frequency bands are classified as a plurality of first bins and second bins based on the determined average energy in each of the frequency bands; and recovering the data in the first set of frequency bins at the detection position by the first predefined algorithm, and recovering the data in the second set of frequency bins of the incorrect data packets by the second predefined algorithm according to the n consecutive data packets including the incorrect data packet at the detection position when the data packet at the detection position is incorrect, wherein n is integers greater than or equal to 1.

13. The device method according to claim 12, wherein the n consecutive data packets are n consecutive data packets starting from x-th data packet in front of the incorrect data packets at the detection position, and x is greater than or equal to 0 and less than or equal to n−1.

14. A Bluetooth receiver, comprising:
an antenna;
a memory configured for storing one or more modules; and
a processor configured for executing the modules to perform:
receiving audio data including a plurality of data packets;
transforming the audio data in a time domain to a frequency domain, wherein spectrum of the audio data is divided into a plurality of bands;
determining incorrect data packets among n consecutive data packets and average energy in each of frequency bands in the frequency domain, wherein spectrum of the incorrect data packets is divided into a plurality of bands the frequency bands are classified as a plurality of first bins and second bins based on the determined average energy in each of the frequency bands taking the average energy in each of the first bins for the correct data packets as energy of the second bins for the incorrect data packets; and recovering data in the first bins by a first predefined algorithm, and recovering data in the second set of frequency bins by a second predefined algorithm, wherein the second predefined algorithm.

15. The Bluetooth receiver according to claim 14, wherein the first predefined algorithm is a GAPES algorithm and the second predefined algorithm takes far less computation than what the GAPES algorithm takes, resulting in an audio packet loss concealment achieved more efficiently than otherwise using the GAPES entirely through the frequency bands.

16. The Bluetooth receiver according to claim 14, where the processor is configured for executing the modules to further perform:
buffering spectrum of the correct data packet.

17. The Bluetooth receiver according to claim 16, wherein said recovering data in the first bins by a first predefined algorithm, and recovering data in the second bins by a second predefined algorithm comprises:
inputting the data packets sequentially from an input position to a processing queue in a receiving order, wherein the processing queue includes P positions each used to store one data packet, and including the input position, an output position, and a detection position N located at a fixed position between the input position and the output position, and P is an integer greater than or equal to 2; and recovering the data in the first set of frequency bins in the incorrect data packets of n consecutive data packets including the incorrect data packet at the detection position by the GAPES algorithm, and recovering the data in the second set of frequency bins of the incorrect data packets in the n consecutive data packets by the simple algorithm according to the n consecutive data packets including the incorrect data packet at the detection position when the data packet at the detection position is incorrect, wherein n is integers greater than or equal to 1.

* * * * *